(12) United States Patent
Murakami

(10) Patent No.: US 12,738,747 B2
(45) Date of Patent: Sep. 15, 2026

(54) POWER GENERATION SYSTEM

(71) Applicant: TOYOTA JIDOSHA KABUSHIKI KAISHA, Toyota (JP)

(72) Inventor: Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/286,317

(22) Filed: Jul. 31, 2025

(65) Prior Publication Data

US 2026/0100594 A1 Apr. 9, 2026

(30) Foreign Application Priority Data

Oct. 3, 2024 (JP) ................................ 2024-174209

(51) Int. Cl.
*H02J 7/35* (2006.01)
*B60L 53/51* (2019.01)
*H02J 105/37* (2026.01)

(52) U.S. Cl.
CPC ................ *H02J 7/35* (2013.01); *B60L 53/51* (2019.02); *H02J 2105/37* (2026.01)

(58) Field of Classification Search
CPC .......... H02J 7/35; H02J 2105/37; B60L 53/51
See application file for complete search history.

(56) References Cited

U.S. PATENT DOCUMENTS

2021/0291686 A1* 9/2021 Abe ....................... B60L 8/003

FOREIGN PATENT DOCUMENTS

JP 2020198729 A 12/2020

* cited by examiner

*Primary Examiner* — Carlos Amaya
(74) *Attorney, Agent, or Firm* — Dickinson Wright, PLLC

(57) ABSTRACT

The power generation system includes a power generation device including a solar panel and a control device that controls the power generation device. The control device executes a process of starting the power supply of the power conversion device when the generated power of the solar panel exceeds a start threshold. The control device executes a process of ending the power supply when the generated power falls below an end threshold smaller than the start threshold. The control device executes at least one of a first process, which is a process of increasing the start threshold, and a second process, which is a process of decreasing the end threshold, based on the fact that the index value that increases in conjunction with the generated power amount since the start until the end of the electric power supply is equal to or less than a determination threshold.

3 Claims, 5 Drawing Sheets

1
100
60
61
62
70, 72
70, 71
10, 11
20, 21
30, 31
40
81
80
10, 12
20, 22
30, 32
50
90

POWER GENERATION SYSTEM

CROSS-REFERENCE TO RELATED APPLICATION

This application claims priority to Japanese Patent Application No. 2024-174209 filed on Oct. 3, 2024, incorporated herein by reference in its entirety.

BACKGROUND

1. Technical Field

The present disclosure relates to a power generation system.

2. Description of Related Art

Japanese Unexamined Patent Application Publication No. 2020-198729 (JP 2020-198729 A) discloses a power generation system that supplies power generated by a power generation device including a solar panel to a hydrogen production apparatus.

SUMMARY

In the power generation system described above, the power generated by the solar panel increases and decreases according to the amount of solar radiation to the solar panel. For example, when the amount of solar radiation in the daytime fluctuates greatly due to repetition of sunny and cloudy weather, a phenomenon (hereinafter referred to as hunting) in which the power supply by the power generation device is repeatedly started and ended frequently is likely to occur. When hunting occurs, an inrush current may flow to an electronic component of the power generation system, or a thermal stress may act on a solder-bonded portion of the power generation system. As a result, a failure of the power generation system may occur.

In order to address the above issue, a power generation system includes: a power generation device that includes a solar panel and a power conversion device that supplies power of the solar panel to an electrical load; and a control device that controls the power generation device.

The control device executes a process of starting power supply of the power conversion device when power generated by the solar panel exceeds a start threshold.

The control device executes a process of ending the power supply when the generated power falls below an end threshold that is a threshold smaller than the start threshold.

The control device executes at least one of a first process and a second process, the first process being a process of increasing the start threshold based on a fact that an index value that increases in conjunction with an amount of power generated since a start until an end of the power supply is equal to or less than a determination threshold, and the second process being a process of decreasing the end threshold based on the fact.

The power generation system described above can suppress the occurrence of hunting.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment of a power generation system will be described with reference to FIGS. 1 to 3.

Overall Configuration

Figure 1:
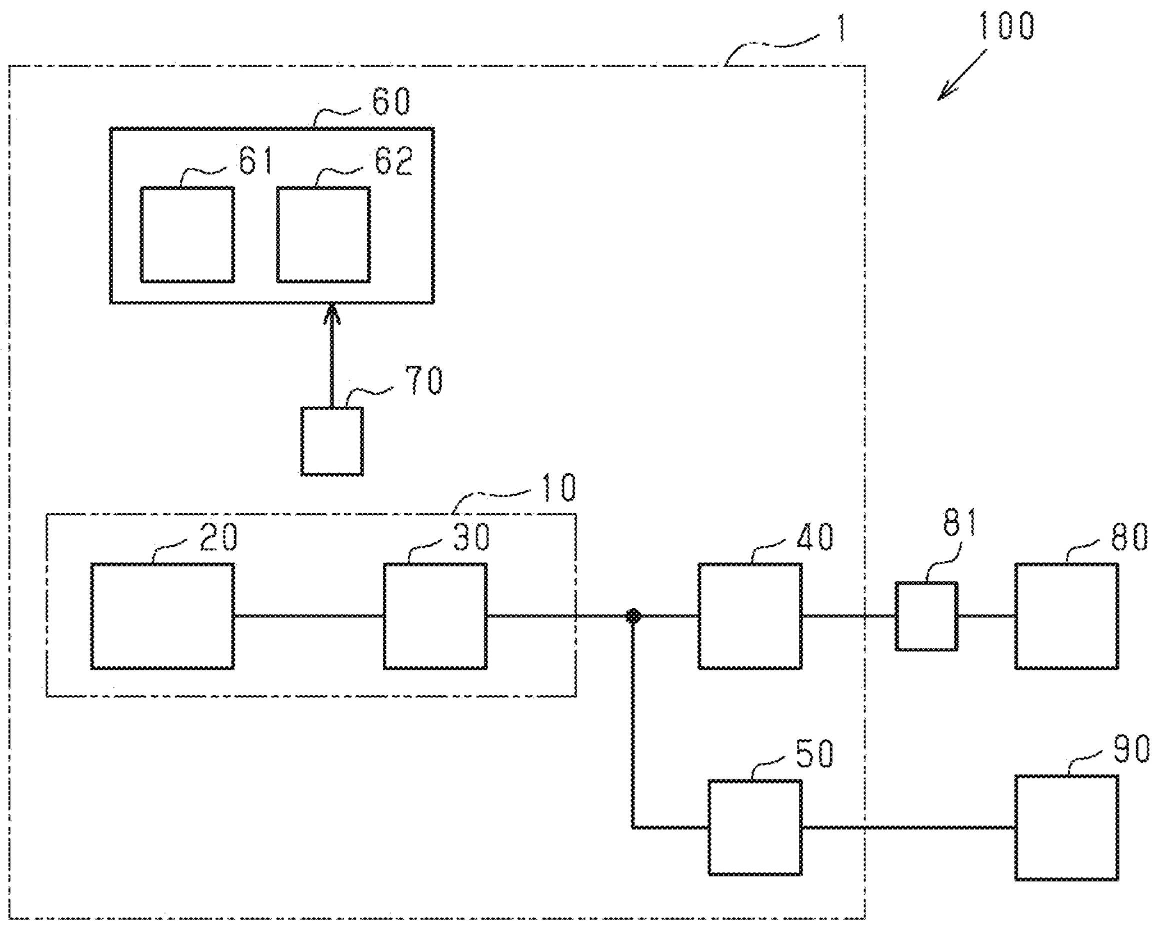
FIG. 1 is a schematic configuration diagram of a power generation system according to a first embodiment.

The power generation system 1 illustrated in FIG. 1 is mounted on, for example, a vehicle 100. The power generation system 1 includes a power generation device 10 and a control device 60. The power generation device 10 includes a solar panel 20 and a power conversion device 30.

The solar panel 20 is configured in a panel shape by arranging a plurality of solar cells that generate electric power by irradiation of sunlight. The solar panel 20 is constituted by at least one panel. The solar panel 20 is installed on, for example, a roof of the vehicle 100. The solar panel 20 may be installed on a bonnet of the vehicle 100.

The power conversion device 30 supplies the electric power generated by the solar panel 20 to the electric load. The electrical load includes, for example, a drive battery 80 and an auxiliary battery 90 of the vehicle 100.

The drive battery 80 is a secondary battery. The drive battery 80 stores power supplied from the power conversion device 30. The drive battery 80 supplies electric power to a drive system mounted on the vehicle 100. The drive train of the vehicle 100 includes one or more motors for driving the vehicle 100.

A relay circuit 81 is provided between the drive battery 80 and the power generation device 10. The relay circuit 81 can switch between a state in which power can be supplied from the power generation device 10 to the drive battery 80 and a state in which power cannot be supplied from the power generation device 10 to the drive battery 80. The relay circuit 81 is switched to a state in which power can be supplied, for example, when power is supplied from the power generation device 10. The relay circuit 81 may be controlled by the control device 60.

The auxiliary battery 90 is a secondary battery. The auxiliary battery 90 stores power supplied from the power conversion device 30. The auxiliary battery 90 supplies electric power to an auxiliary system mounted on the vehicle 100. The auxiliary equipment system of the vehicle 100 includes one or more auxiliary equipment. Examples of the auxiliary machine include an electric oil pump, a navigation system, and lights. A relay circuit (not shown) is provided between the auxiliary battery 90 and the power generation device 10.

The power conversion device 30 lowers or boosts the DC voltage and outputs the voltage. The power conversion device 30 is a DC-DC converter. The power conversion device 30 is connected to the solar panel 20. The power conversion device 30 converts an output voltage of the solar panel 20, which is an input voltage, into a voltage based on an instruction from the control device 60, and outputs the voltage. The type of the power conversion device 30 may be set according to the type of the electrical load.

A power conversion device 40 for the drive battery 80 is provided in a power path between the power conversion device 30 and the drive battery 80. The power conversion device 40 converts the voltage output from the power conversion device 30 into a voltage within a predetermined range and outputs the voltage to the drive battery 80. A power conversion device 50 for the auxiliary battery 90 is provided in a power path between the power conversion device 30 and the auxiliary battery 90. The power conversion device 50 converts the voltage output from the power conversion device 30 into a voltage within a predetermined range and outputs the voltage to the auxiliary battery 90. The voltage output by the power conversion device 50 is lower than the voltage output by the power conversion device 40.

The control device 60 includes a CPU 61 and memories 62. The memory 62 stores in advance various programs in which processes to be executed by CPU 61 are described. CPU 61 controls the power conversion device 30 by executing programs stored in the memories 62.

The power generation system 1 further includes a measurement circuit 70. The measurement circuit 70 detects current and voltage in the power path between the solar panel 20 and the power conversion device 30. The measurement circuit 70 outputs a signal corresponding to the voltage and the current detected by itself to the control device 60.

Power Supply Process

The control device 60 executes a power supply process of supplying power to the power conversion device 30 based on the generated power P of the solar panel 20. Here, the power supply of the power conversion device 30 indicates that the generated power P is output from the power conversion device 30. The control device 60 executes a process of starting the power supply of the power conversion device 30 when the generated power P exceeds the start threshold value. In addition, the control device 60 executes a process of ending the power supply of the power conversion device 30 when the generated power P falls below the end threshold. The end threshold value is a threshold value smaller than the start threshold value.

The control device 60 acquires the generated power P by the following first method or second method. The first method is a method of determining the generated power P from the current and voltage in the power path between the solar panel 20 and the power conversion device 30. For example, the control device 60 obtains the generated power P by multiplying the current and the voltage in the power path between the solar panel 20 and the power conversion device 30 based on the output from the measurement circuit 70. The second method is a method of determining the generated power P based on PV characteristic line of the power conversion device 30 from the voltage in the power path between the solar panel 20 and the power conversion device 30. The control device 60 estimates the output voltage of the power conversion device 30 from the voltage acquired from the measurement circuit 70, and acquires the output power of the power conversion device 30 that is maximized based on PV property line from the output voltage as the generated power P.

The control device 60 controls the start and end of the power supply of the power conversion device 30 by, for example, outputting an instruction signal related to the output voltage of the power conversion device 30 to the control device 60. The control device 60 controls the output voltage of the power conversion device 30 with reference to the output power of the power conversion device 30, for example. The output voltage and the output current of the power conversion device 30 are obtained, and the output power of the power conversion device 30 is calculated by multiplying these values.

Here, a PV characteristic line for the control device 60 to determine the output-voltage of the power conversion device 30 will be described. PV characteristic line represents the correspondence between the output voltage of the power conversion device 30 and the output power of the power conversion device 30 in the Cartesian coordinates in which the output voltage is taken as the X-axis and the output power is taken as the Y-axis. PV profile is basically a mountain profile. That is, PV property line is distributed with a maximum of the output power, in which the output power of the power conversion device 30 changes from increasing to decreasing. The control device 60 acquires an output voltage at which the output power of the power conversion device 30 is maximized, for example, by using a known hill-climbing method.

When the power supply of the power conversion device 30 is not performed, the control device 60 executes the power supply process at predetermined time intervals. The predetermined period is, for example, 15 minutes. That is, the control device 60 compares the generated power P with the start threshold value at predetermined intervals. The control device 60 may execute the power supply processing when receiving the power supply request signal from the outside.

Threshold Change Process

The control device 60 executes threshold change processing for changing at least one of the start threshold value and the end threshold value by comparing an index value that increases in conjunction with the generated power amount A of the solar panel 20 with a determination threshold value. The generated power amount A indicates the total generated power amount obtained by integrating the generated power P in the period from the start to the end of the electric power supply. The generated power amount A is, for example, an integrated value of the generated power P in a period from the start of the electric power supply to the next end.

The first example and the second example of the index value will be described. In the first example, the index value is a duration from the start to the end of the power supply. In the first example, the determination threshold is a determination period. In the second example, the index value is the amount of generated power from the start to the end of the electric power supply. In the second example, the determination threshold value is the determination power amount. The control device 60 acquires an index value from a history of past power supply. The history of the past power supply includes information such as a start time of the power supply, an end time, and a variation of the generated power P. As the index value, an index such as the amount of solar radiation to the solar panel 20, the amount of variation in the amount of solar radiation, the number of variations in the amount of solar radiation, and the maximum generated power P in a period from the start to the end of the electric power supply may be used.

The control device 60 executes at least one of the first process and the second process based on the index value being equal to or less than the determination threshold value. The first process is a process of increasing the start threshold. In the first process, for example, a value obtained by multiplying the start threshold by the first predetermined value is set as a new start threshold. The first predetermined value is, for example, greater than 1 and equal to or less than 2. For example, the first predetermined value is 1.5. In the first process, the start threshold may be increased by adding a predetermined value to the start threshold. The second process is a process of reducing the end threshold value. In the second process, for example, a value obtained by multiplying the end threshold by the second predetermined value is set as a new end threshold. The second predetermined value is, for example, greater than 0 and less than 1. The second predetermined value is 0.5, for example. In the second process, the end threshold value may be reduced by subtracting a predetermined value from the end threshold.

The control device 60 executes at least one of the first process and the second process so that a difference (hereinafter, referred to as a hysteresis width) between the start threshold and the end threshold is increased based on the index value being equal to or less than the determination threshold. That is, the control device 60 increases the start threshold value in the first process and maintains the end threshold value or reduces the end threshold value. In addition, the control device 60 reduces the end threshold value in the second process and maintains the start threshold value or increases the start threshold value.

The control device 60 may further execute at least one of the third process and the fourth process based on the index value being larger than the determination threshold value.

The third process is executed, for example, when the index value is larger than the determination threshold after the first process is executed based on the index value being equal to or smaller than the determination threshold. The third process is a process of reducing the start threshold. In the third process, for example, a value obtained by dividing the start threshold by the first predetermined value is set as a new start threshold.

The fourth process is executed when the index value is larger than the determination threshold value after the second process is executed based on the index value being equal to or smaller than the determination threshold value. The fourth process is a process of increasing the end threshold. In the fourth process, for example, a value obtained by dividing the end threshold by the second predetermined value is set as a new end threshold.

Processing by Control Device

Processing by the control device 60 will be described with reference to FIG. 2. The control device 60 executes the processing of FIG. 2 at predetermined time intervals. In FIG. 2, processing from S11 to S15 corresponds to the power supplying processing, and processing from S21 to S24 corresponds to the threshold changing processing. In the example of FIG. 2, the power supply process is executed after the threshold change process. The threshold change process may be executed after the power supply process.

Figure 2:
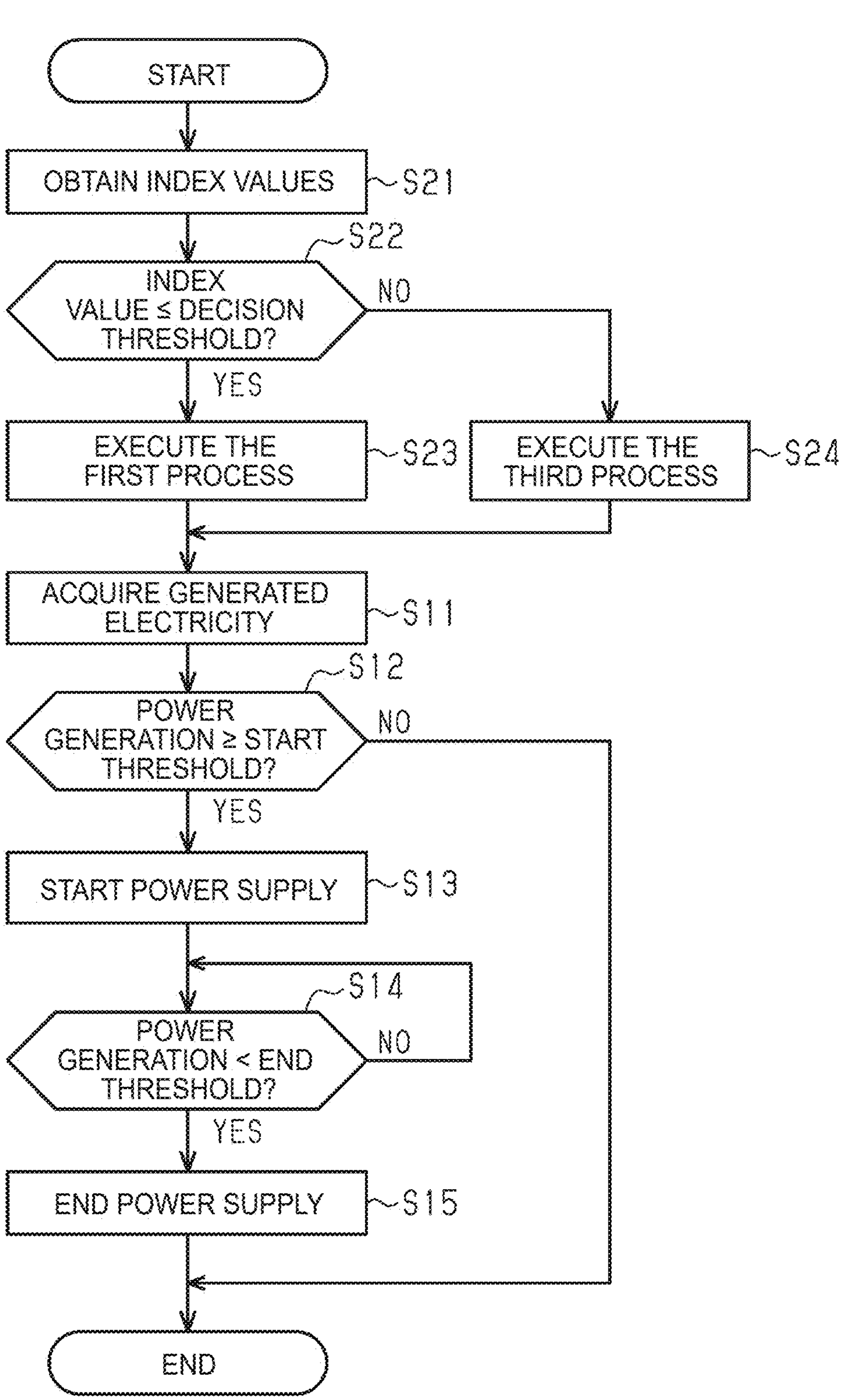
FIG. 2 is a flowchart showing a process performed by the control device of FIG. 1.

In the example of FIG. 2, a case where the first process and the third process are executed in the threshold change process will be exemplified. A second process may be performed in S23 instead of or in addition to the first process. When the second process is performed in S23, the fourth process may be performed in S24. When the end threshold value is set to the lower limit value of the generated power P, the second process is not executed, and only the first process is executed.

In S21, the control device 60 proceeds to S22 after acquiring the index. The control device 60 has, for example, a function of measuring a time period from when power supply is started by S13 in the previous power supply process until when power supply is ended by S15. The control device 60 has, for example, a function of calculating a generated power A from when the power supply is started in S13 in the previous power supply process until when the power supply is ended in S15.

In S22, the control device 60 determines whether or not the index is equal to or less than the determination threshold. When the index value is equal to or less than the determination threshold value, the control device 60 proceeds to S23. If the index value is not less than or equal to the determination threshold, that is, the index value is greater than the determination threshold, the control device 60 proceeds to S24. In S23, the control device 60 executes the first process and then proceeds to S11. In S24, the control device 60 executes the third process and then proceeds to S11.

In S11, the control device 60 acquires the generated power P, and then proceeds to S12. The control device 60 acquires the generated power P by the first method or the second method.

In S12, the control device 60 determines whether or not the generated power P is equal to or greater than a starting threshold. If the generated power P is equal to or greater than the starting threshold, the control device 60 proceeds to S13. When the generated power P is not equal to or larger than the start threshold, that is, when the generated power P is less than the start threshold, the control device 60 ends the process of FIG. 2. In S13, the control device 60 starts supplying power to the power conversion device 30, and then proceeds to S14.

In S14, the control device 60 determines whether the generated power P is less than the termination threshold. If the generated power P is less than the termination threshold, the control device 60 proceeds to S15. When the generated power P is not less than the end threshold value, that is, when the generated power P is greater than or equal to the end threshold value, the control device 60 repeats S14 process. In S15, the control device 60 ends the process of FIG. 2 after finishing supplying power to the power conversion device 30.

Figures 3, 4:
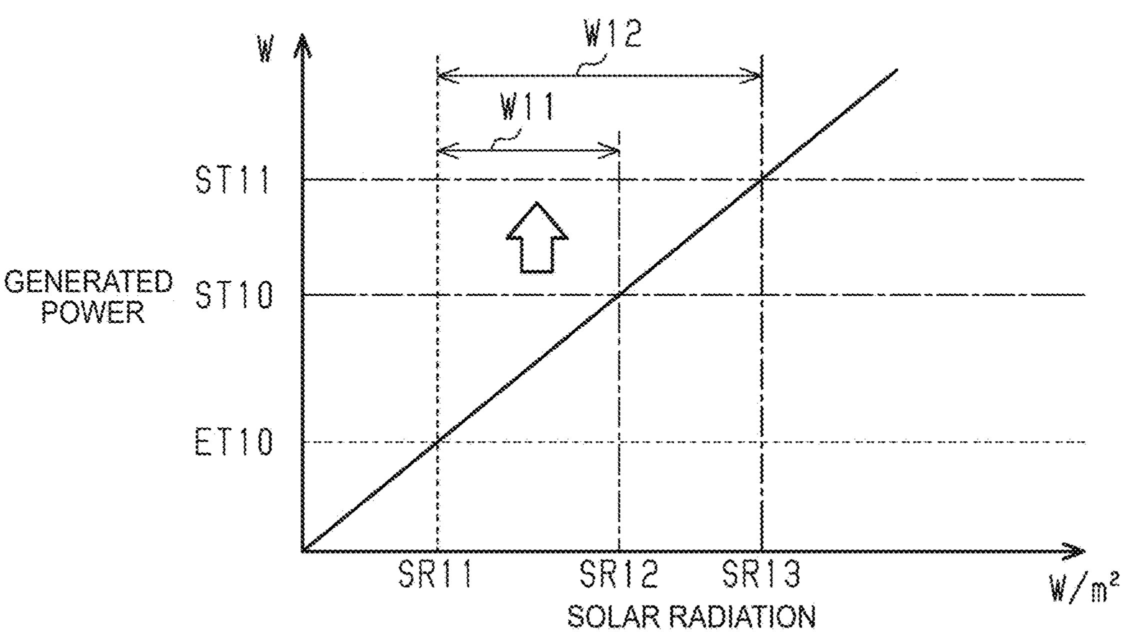
FIG. 3 is a graph showing the relationship between the amount of solar radiation and the generated power in the power generation system of FIG. 1.
FIG. 4 is a schematic configuration diagram of a power generation system according to a second embodiment.

Operation and Effect of Present Embodiment (1-1) As indicated by a solid line in the graph of FIG. 3, the generated power P of the solar panel 20 increases as the amount of solar radiation to the solar panel 20 increases. In the embodiment of FIG. 3, in the first state prior to the threshold change process, the starting threshold value is ST10 and the ending threshold value is ET10. In the first condition, when the amount of solar radiation increases to SR12, the generated power P exceeds ST10, and thus the electric power of the power conversion device 30 starts to be supplied. Thereafter, when the amount of solar radiation is reduced to SR11, the electric power is supplied.

In the second condition after the first process of the threshold change process is performed, the starting threshold increases from ST10 to ST11. When the amount of solar radiation fluctuates due to the influence of weather or the like, the generated power P also fluctuates. In particular, when the generated power P repeatedly changes below the end threshold value after the generated power P exceeds the start threshold value, hunting is likely to occur. When hunting occurs, an inrush current may flow through the electronic components of the power generation device 10, or a thermal stress may act on the solder-bonded portion of the power generation device 10. As a result, a failure of the power generation device 10 may be caused. In addition, there is a possibility that a burden is imposed on the components of the vehicle 100 such as the relay circuit 81 due to the occurrence of hunting.

In this regard, the control device 60 executes at least one of the first process and the second process based on the fact that the index value is equal to or less than the determination threshold. When hunting occurs, the generated power amount A of the solar panel 20 decreases, and thus the index value also decreases. According to this configuration, by executing the first process based on the index value being equal to or less than the determination threshold value, it is difficult to start the power supply of the power conversion device 30. On the other hand, by executing the second process based on the index value being equal to or less than the determination threshold value, it is difficult to end the power supply of the power conversion device 30. As a result, in the power generation device 10, occurrence of a failure of the power device caused by hunting or hunting can be suppressed.

(1-2) The larger the hysteresis width, the less likely the power supply is to end after the power supply is started. In FIG. 3, the hysteresis width W12 of the solar radiation amount from S11 to S13 is larger than the hysteresis width W11 of the solar radiation amount from S11 to S12. Therefore, in the second state, the power supply is less likely to be ended after the power supply is started than in the first state.

The control device 60 executes at least one of the first process and the second process so that the hysteresis width is increased based on the fact that the index value is equal to or less than the determination threshold. According to this configuration, when at least one of the first process and the second process is executed, the hysteresis width increases. As a result, after the power supply of the power conversion device 30 is started, the power supply is less likely to be terminated, and therefore, the hunting is less likely to occur.

Second Embodiment

Figure 5:
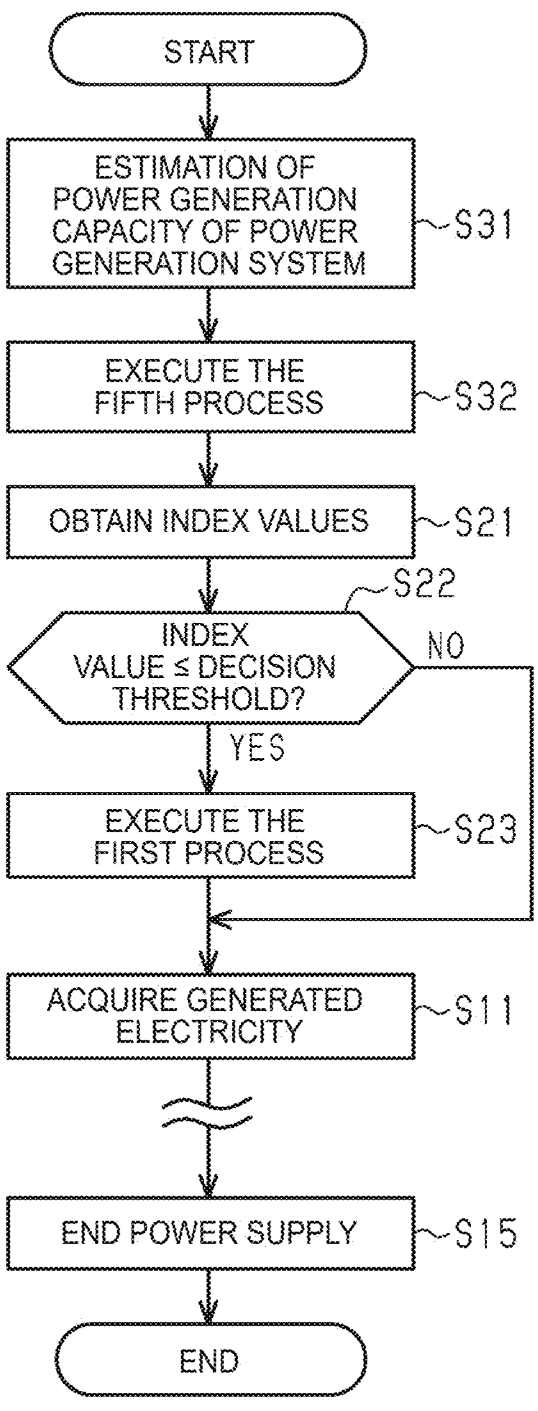
FIG. 5 is a flow chart showing the process by the control device of FIG. 4.

A second embodiment of the power generation system will be described with reference to FIG. 4 to FIG. 6.

In the following description, portions different from those of the first embodiment will be mainly described. The same components as those in the first embodiment are denoted by the same reference numerals, and the description thereof will be omitted.

In the second embodiment, the power generation system 1 includes a plurality of power generation devices 10. Each of the plurality of power generation devices 10 includes a predetermined solar panel as the solar panel 20 and a predetermined power conversion device as the power conversion device 30. The plurality of power generation devices 10 includes, for example, a first power generation device 11 and a second power generation device 12. The first power generation device 11 includes a first solar panel 21 as the solar panel 20 and a first power conversion device 31 as the power conversion device 30. The first power conversion device 31 supplies the electric power generated by the first solar panel 21 to the electric load. The second power generation device 12 includes a second solar panel 22 as the solar panel 20 and a second power conversion device 32 as the power conversion device 30. The second power conversion device 32 supplies the electric power generated by the second solar panel 22 to the electric load. The control device 60 of the present embodiment controls both the first power generation device 11 and the second power generation device 12.

In the vehicle 100, the first solar panel 21 and the second solar panel 22 are provided at different locations. For example, the first solar panel 21 is installed in a roof of the vehicle 100. The second solar panel 22 is installed on the bonnet of the vehicle 100.

The measurement circuit 70 includes a first measurement circuit 71 and a second measurement circuit 72. The first measurement circuit 71 detects a current and a voltage in a power path between the first solar panel 21 and the first power conversion device 31. The second measurement circuit 72 detects a current and a voltage in a power path between the second solar panel 22 and the second power conversion device 32. In the present embodiment, the control device 60 acquires each of the first generated power P1 which is the generated power of the first solar panel 21 and the second generated power P2 which is the generated power of the second solar panel 22 by the first method or the second method described above.

In the present embodiment, the generated power P of the solar panel 20 is the sum of the generated power of each of the solar panels 20 of the plurality of power generation devices 10. The control device 60 executes a process of starting the power supply of the power conversion devices 30 of the plurality of power generation devices 10 when the sum of the generated power of the solar panels 20 of the plurality of power generation devices 10 exceeds the start threshold value. When the sum of the generated power of the solar panels 20 of each of the plurality of power generation devices 10 falls below the end threshold value, a process of ending the power supply of the power conversion devices 30 of each of the plurality of power generation devices 10 is executed.

The generated power P of the solar panel 20 is, for example, the sum of the first generated power P1 and the second generated power P2. The power supply of the power conversion device 30 is the power supply of the first power conversion device 31 and the power supply of the second power conversion device 32. That is, when the sum of the first generated power P1 and the second generated power P2 exceeds the start threshold, the control device 60 executes a process of starting the power supply of the first power conversion device 31 and the power supply of the second power conversion device 32. When the sum of the first generated power P1 and the second generated power P2 falls below the termination thresholds, the control device 60 executes a process of terminating the power supply of the first power conversion device 31 and the power supply of the second power conversion device 32.

Threshold Setting Process

The control device 60 of the present embodiment estimates the power generation capacity C of the power generation system 1 based on the generated power of the solar panel 20 of each of the plurality of power generation devices 10, and performs threshold setting processing for setting a start threshold value based on the power generation capacity C of the power generation system 1. The power generation capacity C is an amount of generated power per unit time of the solar panel 20 used in the power generation system 1. The larger the power generation capacity C, the larger the generated power P with respect to the solar radiation amount in the power generation system 1, and therefore, the larger the power generation capacity C, the larger the fluctuation range of the generated power P with respect to the fluctuation range of the solar radiation amount.

The power generation capacity C is determined by the per-day direction of each of the plurality of power generation devices 10 to the solar panel 20 and the power generation capacity of each of the plurality of power generation devices 10 to the solar panel 20. The power generation capacity of each solar panel 20 of the plurality of power generation devices 10 is determined by factors such as the number of panels included in each solar panel 20, the total area of the panels, and the cell conversion efficiency of the solar cells.

The control device 60 executes the fifth process based on the power generation capacity C of the power generation system 1. The fifth process is a process of setting the start threshold so that the start threshold value when the power generation capacity C is large is larger than the start threshold value when the power generation capacity C is small. The control device 60 includes, for example, a calculation unit such as a map, an arithmetic expression, and the like, in which a larger start threshold is calculated as the power generation capacity C is larger.

The control device 60 estimates the power generation capacity C of the power generation system 1 based on the generated power of each of the solar panels 20 of the plurality of power generation devices 10. For example, the control device 60 estimates the power generation capacity C based on the first generated power P1 and the second generated power P2.

A method of estimating the power generation capacity C of the power generation system 1 will be described. In the following explanation, it is assumed that the first power generation capacity C1, which is the power generation capacity of the first solar panel 21, is larger than the second power generation capacity C2, which is the power generation capacity of the second solar panel 22. Here, the first power generation capacity C1 being larger than the second power generation capacity C2 indicates that the first generated power P1 of the first solar panel 21 is larger than the second generated power P2 of the second solar panel 22 when the amount of solar radiation to the first solar panel 21 is equal to the amount of solar radiation to the second solar panel 22. The control device 60 estimates the power generation capacity C of the power generation system 1 by the third method or the fourth method.

The third method is a method of estimating the power generation capacity C based on the number of solar panels 20 on the day of the solar panel 20 used in the power generation system 1. The larger the number of solar panels 20 on the day, the larger the generated power P with respect to the solar radiation amount. Therefore, the control device 60 estimates a larger power generation capacity C as the number of solar panels 20 on the day increases. For example, the power generation capacity C when both the first solar panel 21 and the second solar panel 22 are generating electricity is larger than the power generation capacity C when either one of the first solar panel 21 and the second solar panel 22 is generating electricity.

The control device 60 determines whether or not the first solar panel 21 is hit by the day based on the generated power P measured by the first measurement circuit 71. Similarly, the control device 60 determines whether or not the second solar panel 22 is hit by the day based on the generated power P measured by the second measurement circuit 72.

A fourth method is a method of estimating the power generation capacity C based on the power generation capacity of each of the solar panels 20 of the plurality of power generation devices 10. The higher the power generation capacity of the solar panel 20, the larger the generated power P with respect to the amount of solar radiation to the solar panel 20. The larger the power generation capacity of the solar panel 20 on the day, the larger the power generation capacity C of the power generation system 1 calculated by the control device 60. Due to the large number of solar panels 20 on the day, the cell conversion efficiency of the solar cells included in the solar panels 20 on the day, and the like, the power generation capacity of the solar panels 20 on the day increases.

The control device 60 stores, for example, a first power generation capacity C1 of the first solar panel 21 and a second power generation capacity C2 of the second solar panel 22. Here, the generated power P is the sum of the first generated power P1 and the second generated power P2. The power generation capacity C is determined by a first ratio of the first generated power P1 to the generated power P and a second ratio of the second generated power P2 to the generated power P.

For example, when the first ratio is 1 and the second ratio is 0, the power generation capacity C of the power generation system 1 is determined only by the first power generation capacity C1. On the other hand, when the first ratio is 0 and the second ratio is 1, the power generation capacity C of the power generation system 1 is determined only by the second power generation capacity C2.

When the first ratio is k ($0.5<k\leq1$) and the second ratio is ($1-k$), the influence of the first power generation capacity C1 is larger for the power generation capacity C than the influence of the second power generation capacity C2. When the first ratio is k ($0\leq k<0.5$) and the second ratio is ($1-k$), the influence of the first power generation capacity C1 is smaller than the influence of the second power generation capacity C2 in the power generation capacity C.

Here, the control device 60 obtains the first generated power P1 by multiplying the current and the voltage in the power path between the first solar panel 21 and the power conversion device 30, for example, based on the output from the first measurement circuit 71. Further, the control device 60 obtains the second generated power P2 by multiplying the current and the voltage in the power path between the second solar panel 22 and the power conversion device 30, for example, based on the output from the second measurement circuit 72.

Processing by the control device 60 will be described with reference to FIG. 5. The control device 60 executes the processing of FIG. 2 at predetermined time intervals. In FIG. 5, the processes of S31 and S32 correspond to the threshold-setting process. Processing of S23 from S21 corresponds to the threshold-changing process. Since the processes from S11 to S15 in FIG. 5 are the same as the processes in FIG. 2, the explanation thereof will be omitted. In FIG. 5, descriptions from S12 to S14 are omitted.

In S31, the control device 60 estimates the power generation capacity C of the power generation system 1, and then proceeds to S32. The control device 60 estimates the power generation capacity C by the third method or the fourth method. In S32, the control device 60 executes the fifth process and then proceeds to S21.

In S21, the control device 60 proceeds to S22 after acquiring the index. In S22, the control device 60 determines whether or not the index is equal to or less than the determination threshold. When the index value is equal to or less than the determination threshold value, the control device 60 proceeds to S23. If the index value is not less than or equal to the determination threshold, that is, the index value is greater than the determination threshold, the control device 60 proceeds to S11. In S23, the control device 60 executes the first process and then proceeds to S11. In the first process of the present embodiment, the starting thresholds set in the fifth process of S32 are increased. A second process may be performed in S23 instead of or in addition to the first process.

Operation and Effect of Present Embodiment (2-1) In the graph of FIG. 6, the generated power P of the power generation system 1 according to the third example (hereinafter, referred to as the third example) is indicated by a solid line, and the generated power P of the power generation system 1 according to the fourth example (hereinafter, referred to as the fourth example) is indicated by a two-dot chain line. The power generation capacity C is proportional to the ratio of the amount of change of the generated power to the amount of change of the solar radiation. In the example of FIG. 6, the power generation capacity C in the third example is larger than the power generation capacity C in the fourth example.

Figure 6:
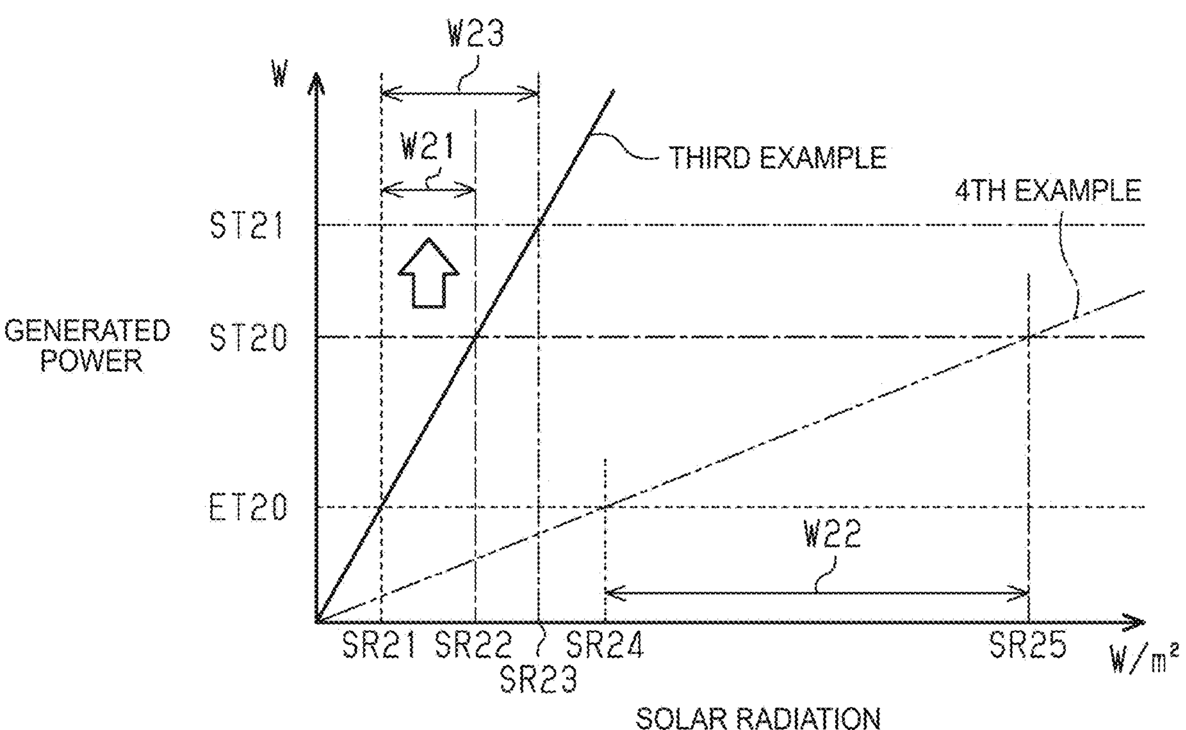
FIG. 6 is a graph showing a relationship between the solar radiation amount and the generated power in the power generation system of FIG. 4.

In the example of FIG. 6, when the starting threshold is ST20 and the ending threshold is ET20, the hysteresis-width of the third example is W21 from SR21 to SR22. On the other hand, when the starting threshold is ST20 and the ending threshold is ET20, the hysteresis-width of the fourth embodiment is W22 from SR24 to SR25. In this way, when the start threshold value and the end threshold value are the same, the higher the power generation capacity C of the power generation system 1, the smaller the hysteresis width.

In this regard, the control device 60 executes the fifth process of setting the start threshold so that the start threshold value when the power generation capacity C is large is larger than the start threshold value when the power generation capacity C is small. In the example of FIG. 6, the starting thresholds are increased from SR20 to SR21 in the third example. In FIG. 6, the fifth process increases the hysteresis-width from W21 to W23 from SR21 to SR23. The larger the power generation capacity C, the larger the variation range of the generated power P with respect to the variation range of the solar radiation amount. When the power generation capacity C is large, the start threshold becomes large, and the hysteresis width also becomes large, so that hunting is less likely to occur in the power generation system 1.

Modifications

The present embodiment can be realized with the following modifications. The present embodiment and the following modifications can be combined with each other within a technically consistent range to be realized.

The control device 60 may increase the start threshold value and the end threshold value in the first process. The increase amount of the start threshold value in the first process of the present modification example is larger than the increase amount of the end threshold value in the first process. In addition, the control device 60 may reduce the end threshold value in the second process and also reduce the start threshold value. The amount of decrease in the end threshold value in the second process of the present modification example is larger than the amount of decrease in the start threshold value in the second process.

In the threshold change process, at least one of the first process and the second process may be performed such that the difference between the start threshold and the end threshold does not change or decreases. Even in the first process of the present modification, the power supply of the power conversion device 30 is less likely to be started. Also, in the second process of the present modification, it is difficult to end the power supply of the power conversion device 30.

In the second embodiment, the first threshold setting process may be omitted. In this modification, the processing from the processing in FIG. 5 to the processing from S21 to S23 is omitted.

In the second embodiment, a case has been described in which the power generation system 1 includes two power generation devices 10, but the power generation system 1 may include three or more power generation devices 10. The power generation system 1 includes, for example, seven or eight power generation devices 10.

APPENDIXES

Appendix 1

The power generation system includes a power generation device including a solar panel and a power conversion device that supplies power of the solar panel to an electrical load, and a control device that controls the power generation device. The power generation system includes a plurality of the power generation devices. The control device performs a process of starting power supply of the power conversion device when a sum of generated power of the solar panels of each of the plurality of power generation devices exceeds a start threshold value, a process of ending the power supply when the sum falls below an end threshold value that is a threshold value smaller than the start threshold value, and a process of estimating a power generation capacity of the power generation system based on the generated power of the solar panels of each of the plurality of power generation devices, and setting the start threshold value such that the start threshold value when the power generation capacity is large is larger than the start threshold value when the power generation capacity is small.

What is claimed is:

1. A power generation system comprising:

a power generation device that includes a solar panel and a power conversion device that supplies power of the solar panel to an electrical load; and a control device that controls the power generation device, wherein the control device executes:

a process of starting power supply of the power conversion device when power generated by the solar panel exceeds a start threshold;

a process of ending the power supply when the generated power falls below an end threshold that is a threshold smaller than the start threshold; and at least one of a first process and a second process, the first process being a process of increasing the start threshold based on a fact that an index value that increases in conjunction with an amount of power generated since a start until an end of the power supply is equal to or less than a determination threshold, and the second process being a process of decreasing the end threshold based on the fact.

2. The power generation system according to claim 1, wherein the control device executes at least one of the first process and the second process such that a difference between the start threshold and the end threshold becomes large based on the fact that the index value is equal to or less than the determination threshold.

3. The power generation system according to claim 1, wherein:

a plurality of power generation devices is provided;

the generated power is a sum of power generated by respective solar panels of the power generation devices; and the control device estimates a power generation capacity of the power generation system based on the power generated by the respective solar panels of the power generation devices, and executes a process of setting the start threshold such that the start threshold at a time when the power generation capacity is large is larger than the start threshold at a time when the power generation capacity is small.

* * * * *